Jan. 3, 1967     E. PADDISON     3,296,495
POLYPHASE PROTECTIVE RELAY CIRCUITS
Filed Sept. 11, 1963     3 Sheets-Sheet 1

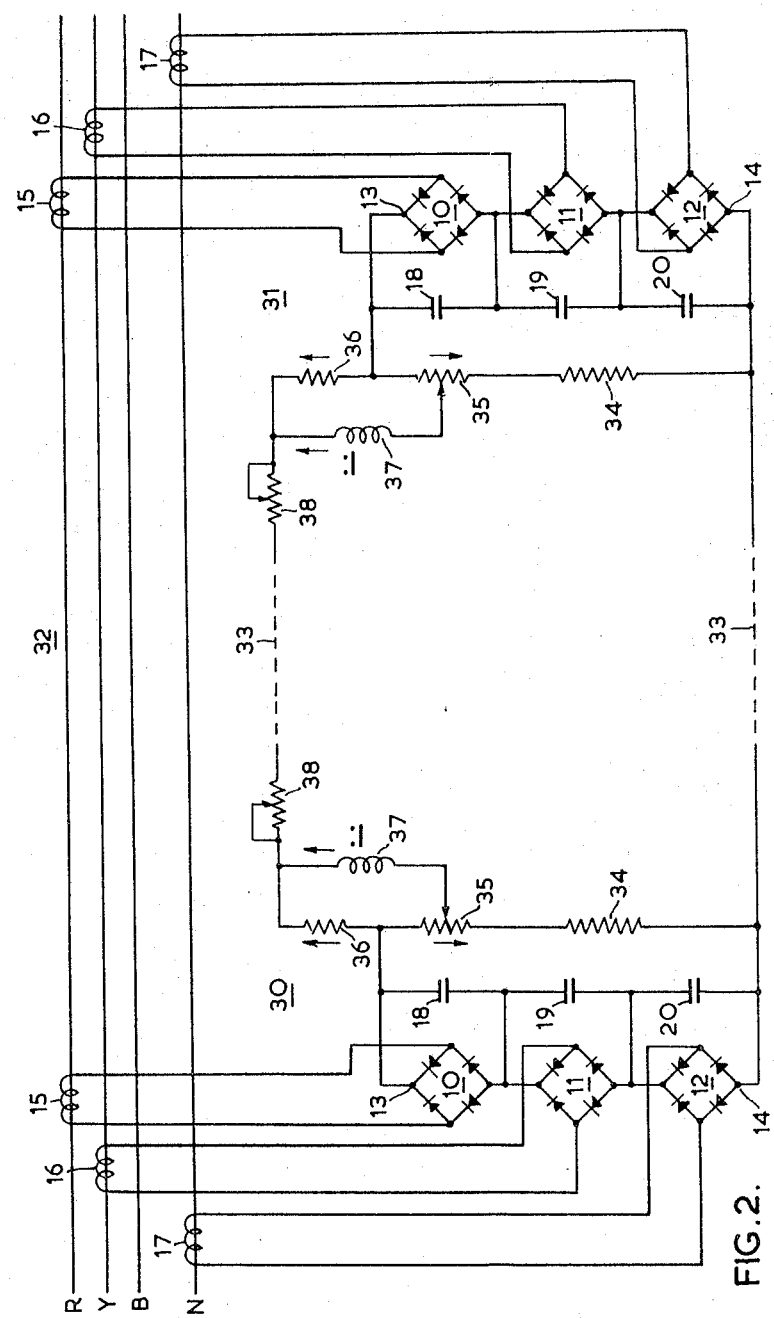

_United States Patent Office_

3,296,495
Patented Jan. 3, 1967

3,296,495
POLYPHASE PROTECTIVE RELAY CIRCUITS
Eric Paddison, Stafford, England, assignor to The English Electric Company Limited, London, England, a British company
Filed Sept. 11, 1963, Ser. No. 308,119
Claims priority, application Great Britain, Sept. 14, 1962, 35,063/62
6 Claims. (Cl. 317—27)

The invention relates to electric circuits. It is particularly, though not exclusively, applicable to such circuits for use with electrical protective relays, and such circuits as incorporated in electrical protective circuit arrangements for use with electrical protective relays.

According to the invention an electric circuit includes a plurality of bridge-type rectifier networks having input terminals and output terminals, a like plurality of input circuit means for enabling a like plurality of input electric signal sources to be connected to the respective input terminals of the networks, and electric output circuit means for connecting the output terminals of the rectifier networks with a pair of load terminals in a manner such that those networks supplied with lesser input signals than the greatest of the input signals contribute no electric current when the circuit is in use to an output load circuit connected between the output terminals.

In one embodiment of the invention, the electric output circuit means comprises means for connecting the output terminals of the respective networks in series to form a series electric circuit extending between the load terminals, and the input circuit means comprises means for enabling a plurality of electric signal currents to be supplied to the respective input terminals of the respective networks, the said signal sources being current sources, and the current flowing through the load terminals when the circuit is in use being the greatest of the electric signal currents.

Advantageously, such a circuit for use with alternating current signal sources, includes a plurality of capacitors each of which is connected in parallel with the output terminals of a different one of the networks for smoothing purposes.

In another embodiment of the invention, the electric output circuit means comprises means for connecting the output terminals of the respective networks in parallel to form an arrangement of parallel circuits connected between the load terminals, and in which the input circuit means comprises means for enabling a plurality of electric signal voltages to be supplied to the respective input terminals of the networks, the said signal sources being voltage sources, and the current flowing through the load terminals when the circuit is in use being dependent upon the greatest of the input signal voltages.

Advantageously, such a circuit, for use with alternating current signal sources, includes a plurality of inductors each of which is serially connected in a different one of the parallel circuits connected between the load terminals for smoothing purposes.

A circuit according to the invention may advantageously be combined with an electrical relay, the operating coil of the relay being connected between the load terminals of the circuit.

According to a feature of the invention, an electrical protective circuit arrangement for detecting faults occurring in a section of a polyphase line system, comprises a first electric circuit and a second electric circuit each as previously described, the first circuit connected so as to receive, in use, input signals which respectively depend on the currents in the line system at one end of the section, and the second circuit connected so as to receive input signals, in use, which respectively depend on the currents in the line system at the other end of the section, separate resistance means being connected between the load terminals of each circuit and the load terminals of the circuits being connected by interconnections so that in use the voltages developed across the resistance means oppose one another, and detecting means, responsive to the flow of current in the interconnections between the two circuits, operating to provide a signal when the voltage across one resistance means is greater than the voltage across the other resistance means.

Preferably, such an electrical protective circuit arrangement includes two resistors in one of the said interconnections and the detecting means comprises two polarised relays each associated with a different one of the circuits and each having its operating coil connected across one said resistor, the relays being polarised so that a flow of current in one direction in the interconnection operates one relay only and a flow of current in the opposite direction in the interconnection operates the other relay only.

Alternatively, the detecting means comprises two polarised relays each associated with a different one of the circuits, each relay having a first coil and a second coil, the first coil opposing the operation of the relay when energised and being connected in series with the resistance means of that circuit with which the relay is associated, the second coil operating the relay when energised sufficiently to overcome the action of the said first coil and being connected in series with the said interconnections through a rectifier bridge network, the rectifier bridge network ensuring that the flow of current in the said second coil is always in the same direction irrespective of the direction of current flowing in the interconnections.

Preferably, the detecting means operates to disconnect the power supply from the said line system.

An electric circuit, and electrical protective circuit arrangements, embodying the various features of the invention will now be described, by way of example, and with reference to the accompanying drawings, in which:

FIG. 2 shows a three-phase electrical protective circuit arrangement;

Figure 1:
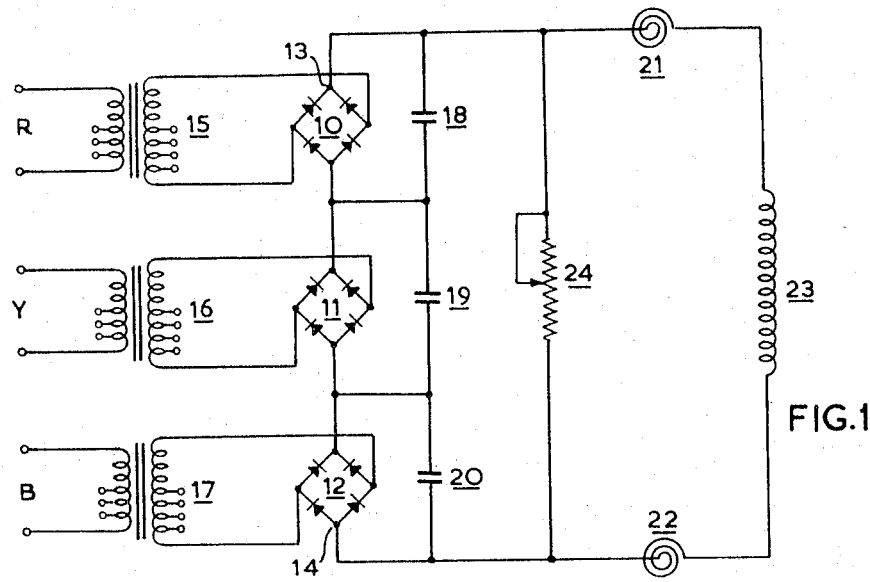
FIG. 1 shows a circuit suitable for use with a motor pattern D.C. time-overcurrent electrical protective relay.

Referring to FIG. 1, three full-wave bridge rectifier networks 10, 11, 12 each consisting of four rectifier elements, have their output terminals connected in series so as to form a unidirectionally conducting path having load terminals 13, 14. The input terminals of each rectifier bridge network are supplied with an alternating current signal derived from one of the phases R, Y, B of a three-phase A.C. supply via a current transformer 15, 16 or 17. The current transformers have identical transformattion ratios and have tappings on their windings as shown for providing individual adjustment of their outputs. A capacitor 18, 19, or 20 is connected across the output terminals of each rectifier bridge network, and the load terminals 13, 14 are connected, via springs 21, 22, to the rotor winding 23 of a motor pattern time-over current relay. The winding 23 is shunted by a variable calibrating resistor 24.

In operation, each current transformer acts to maintain a current in its secondary winding 15 which is dependent only on the current flow in its primary winding and the transformation ratio of the transformer. If all the secondary currents are the same and have a mean value of, for example, $i_1$, then this current ($i_1$) will pass along the unidirectional current path between the load terminals 13, 14 and will divide between the winding 23 of the relay and the resistor 24. If one or more of the secondary currents rises to a value of, for example, $i_2$, then this current ($i_2$) will pass along the current path between the load terminals 13, 14 since the difference current ($i_2-i_1$) is added to that already circulating. The current through the winding 23 is thus dependent on the greatest input current to the current transformers. Therefore, if the inputs to the current transformers are proportional to the currents in the lines of a three-phase power supply system to be protected, and, due to fault conditions, the current in one line increases, the relay will be operated providing protective action. Similarly, the relay will be operated if a fault involving two or three phases develops causing the input current to two or three current transformers to increase.

The rectifier bridge networks have the effect of providing an output signal at the terminals 13, 14 proportional to the largest instantaneous input current to the current transformer. It is found that, if the capacitors 18, 19 and 20 are omitted, then the 120° phase difference between the input currents obtaining in a three-phase power supply system causes, in a case where a fault occurs involving all three lines, the actual current flow through the terminals 13, 14 to be greater than it should be, although the current flow is correct for a single or two-phase fault. The capacitors 18, 19 and 20, by providing a smoothing action, ensure that the output current flowing through the terminals 13 and 14 is proportional to the R.M.S. value of the greatest input current, and the current output is then correctly proportional to the greatest input current for all types of faults.

If desired, the point to one current transformer may be derived from the neutral line (not shown) and the other two inputs may then be desired from, for example, R and Y lines, enabling the relay to be used for earth fault protection. The transformation ratios of the transformers would then be appropriately adjusted.

Referring now to FIG. 2, in which components corresponding to those shown in FIG. 1 are identified by the same reference numerals as are used in FIG. 1, the electrical protective circuit arrangement shown consists of two identical electric circuits designated respectively 30 and 31. Each of these circuits is similar to the circuit of FIG. 1. The two circuits are located at opposite ends of a section 32 of a three-phase transmission line, having three main conductors R, Y, B and a neutral conductor N, which is to be protected, and they are interconnected by a pair of pilot wires 33.

In addition to the current transformers 15, 16, 17 connected to the R, Y and N conductors respectively, the rectifier bridge networks 10, 11, 12 and the capacitors 18, 19, 20, each circuit has series connected resistors 34 and 35 connected across its load terminals 13 and 14. A resistor 36 is connected near each end of one pilot wire 33 and the coil of a polarised relay 37 is connected across this resistor and across an adjustable portion of the resistor 35. Two variable resistors 38 are connected in the pilot wire.

The current obtained from each circuit 30, 31 is proportional to the greatest of the A.C. inputs thereto and is passed through the resistors 34, 35. Under normal conditions in the transmission line, or when faults occur in a part of the line outside the section 32, the voltage drop across the resistors 34 and 35 in the circuit 30 approximately equals the voltage drop across the resistors 34 and 35 in the circuit 31. Consequently, negligible current flows in the pilot wires 33 and the polarised relays 37 are not operated.

However, if a fault occurs in the section 32 of the transmission line, then the greatest current in the line at one end of the section exceeds the greatest current at the other end, and consequently the voltage drops across the resistors 34 and 35 of the two circuits become different and a current will flow in the pilot wires 33. For example, if the voltage drop across the resistors 34 and 35 of the circuit 30 is higher than the corresponding voltage drop in the circuit 31, current will flow in the pilot wire 33 from the circuit 30 to the circuit 31. The flow of the current through the resistor 36 in the circuit 30 will cause development of a voltage drop across this resistor. When this voltage drop has increased sufficiently with respect to the voltage drop across the resistors 34 and 35, the current in the coil of the polarised relay 37 in the circuit 30 will reverse and will flow in the direction of the arrow shown. The increase in the voltage drop across the resistor 36 necessary to produce this reversal of current in the polarised relay coil depends on the magnitude of the ratio $(I_1-I_2)/I_1$ where $I_1$ and $I_2$ are the currents flowing in the resistors 34 and 35 of the circuits 30 and 31 respectively. When the current through the polarised relay coil in the circuit 30 has increased sufficiently, the relay will be operated.

It will be seen from the figure that, as the current in the relay of the circuit 30 increases in the direction tending to operate the relay, the current in the relay of the circuit 31 increases in the direction tending to restrain operation of the relay. When the relay in the circuit 30 is operated, it will trip a circuit breaker (not shown) thus disconnecting from the supply the end of the section 32 which is being monitored by the circuit 30. The direction of current in the pilot wire 33 will therefore reverse if the fault still persists, and hence the polarised relay 37 in the circuit 31 will be operated tripping its associated circuit breaker (also not shown), thus completely isolating the section 32 of the transmission line.

Figure 3:
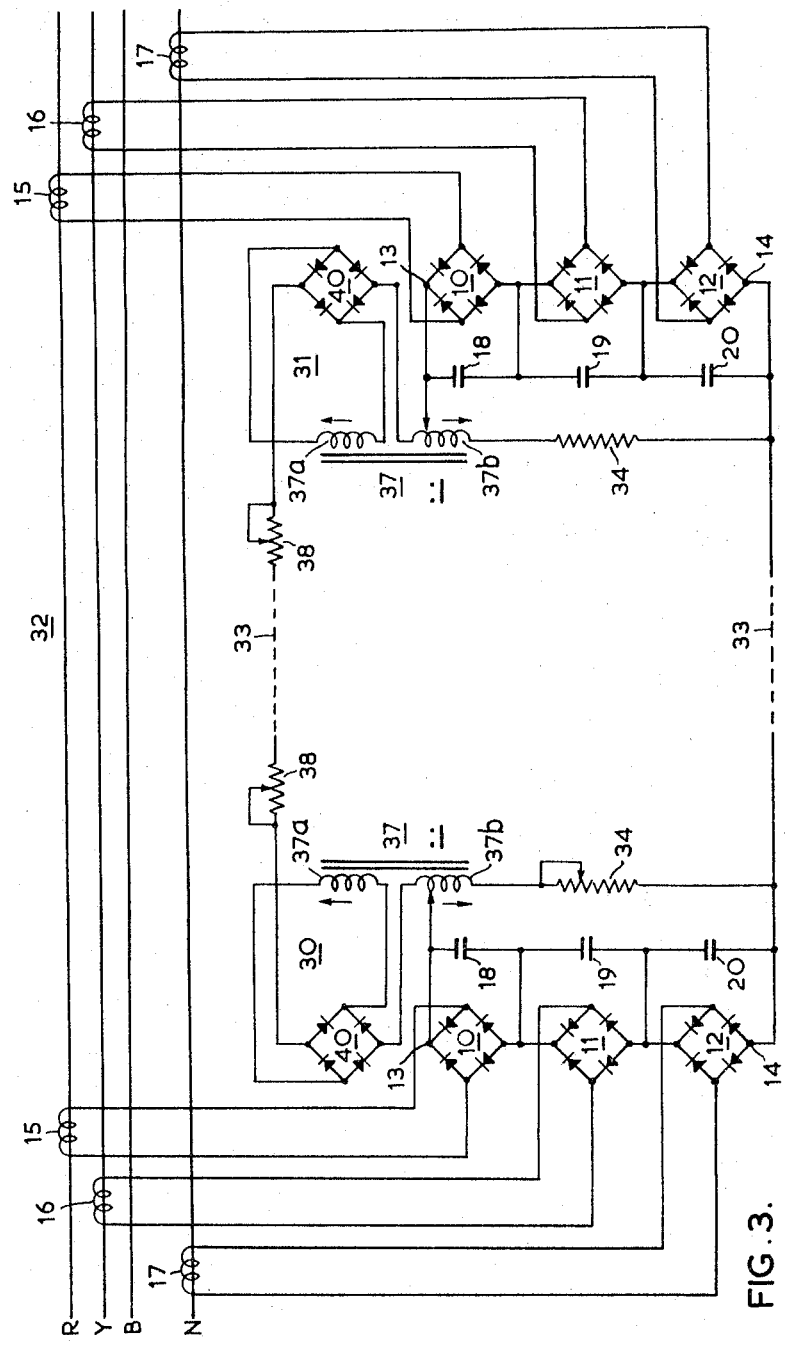
FIG. 3 shows a modification of the arrangement shown in FIG. 2.

In the modified circuit arrangement shown in FIG. 3 in which circuit components corresponding to those shown in FIGS. 1 and 2 are identified by similar reference numerals, each circuit 30 and 31 is provided with a further rectifier bridge network 40 and the polarised relays 37 each have an operating winding 37a and a restraining winding 37b. With the connections as shown, the currents in the operating windings 37a, which flow when the greatest current monitored by one of the circuits 30 and 31 exceeds the greatest current monitored by the other circuit, are always in the relay operating direction, irrespective of the direction of the current in the pilot wires 33. The current flow in the pilot wires 33 also passes through a portion of the restraining winding 37b and tends to oppose the action of this winding. The portions of the winding through which this current flows can be adjusted by means of a tapping on the winding. Therefore, when a fault condition exists, the relays 37 in both the circuits 30 and 31 will operate simultaneously.

It will be appreciated that, since the arrangements shown in FIGS. 2 and 3 compare only the amplitudes of the greatest currents at the two ends of the section 32 and since they are not affected by the phase relationships between these currents, no protection is provided against a fault which is fed equally from both ends of the section. To protect against such an eventuality, a simple directional or circulating current A.C. phase comparison protective system, for example, may be provided in addition to the arrangements described.

Figure 4:
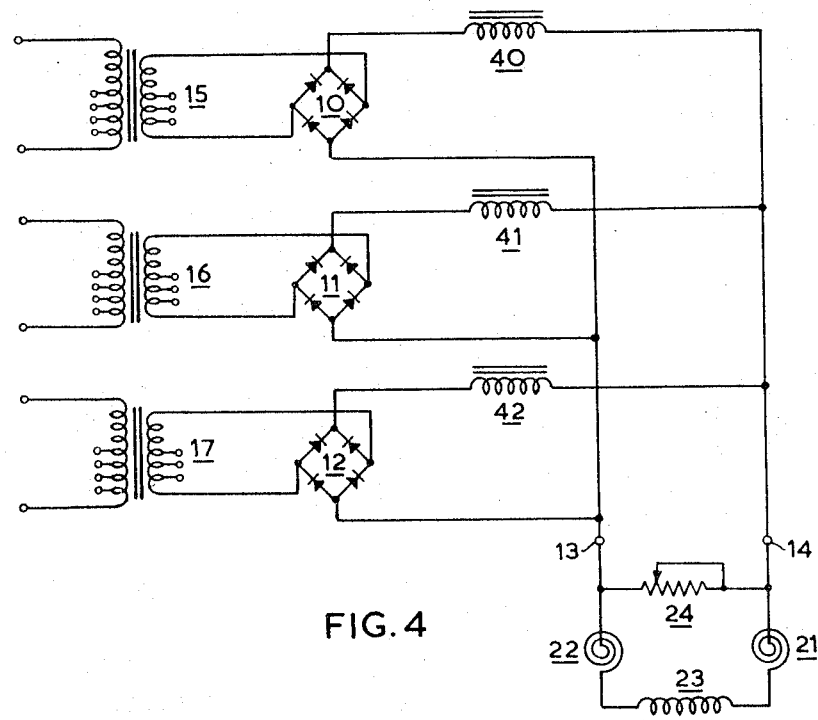
FIG. 4 shows a modification of the circuit shown in FIG. 1.

FIG. 4 shows how the circuit of FIG. 1 may be modified so as to produce an output proportional to the greatest of several input voltages. Items in FIG. 4 corresponding to items in FIG. 1 are similarly referenced. The three A.C. voltage input signals are supplied respectively to three transformers 15, 16 and 17, having identical transformation ratios, whose secondary voltages feed the input terminals of rectifier bridge networks 10, 11 and 12. The output terminals of the rectifier bridge networks are connected in parallel with the load terminals 13 and 14 which are connected through springs 21 and 22 to the winding 23 of a motor-pattern D.C. electrical protective relay.

The adjustable resistor 24 provides a means for varying the current through the winding 23 as before. If the three A.C. input signals have equal voltage, then the mean voltage between the terminals 13, 14 will be proportional to this voltage. If however one A.C. input signal has a greater voltage than the others, then the rectified secondary voltage corresponding to this greater voltage will reverse bias the rectifier elements in the bridge networks connected to the transformers receiving the other input signals since the cathode potential will exceed the anode potential on these latter elements. The voltage between the terminals 13, 14 will thus be dependent only on, and proportional to the greatest voltage input signal. Chokes 40, 41 and 42 perform the same function as the capacitors 18, 19 and 20 in the circuit of FIG. 1, that is, they ensure that the output of each rectifier bridge network is proportional to the R.M.S. value of the corresponding A.C. input signal.

What I claim as my invention and desire to secure by Letters Patent is:

1. A protective circuit arrangement responsive to faults occurring in a selected section of a polyphase supply line comprising,
    two relay circuits coupled to the line conductors at opposite ends of the said selected section, each relay circuit comprising
    a plurality of input circuit means separately coupled to selected conductors in the line for developing signals proportional to the current in these conductors,
    a like plurality of rectifying networks each comprising a bridge rectifier having A.C. terminals connected to said input circuit means D.C. terminals and a smoothing circuit connected to said D.C. terminals,
    connecting means for connecting together the D.C. outputs of all the rectifying networks, and
    resistor means connected in series with said connecting means, the D.C. outputs of all the rectifying networks being connected together in like manner by said connecting means whereby the D.C. to which said resistor means responds is proportional to only the largest mean current traversing any one of said networks during each cycle,
    pilot wire means connecting together the resistor means associated with the two relay circuits so that the voltages developed thereacross are in opposition to one another, and
    a protective device connected to said pilot wire means and responsive to any current flow therethrough.

2. A relay circuit according to claim 1, wherein said D.C. responsive element comprises
    a rotor winding of a motor pattern time-overcurrent relay.

3. A relay circuit according to claim 1, wherein the smoothing circuit in each rectifying network comprises
    a capacitor connected in parallel with the D.C. terminals of said rectifying network, the said connecting means connecting all said networks together in series.

4. A relay circuit according to claim 1, wherein the smoothing circuit in each rectifying network comprises
    an inductor connected in series with the D.C. terminals of said rectifying network, the said connecting means connecting all the said networks together in parallel.

5. A protective circuit arrangement according to claim 1, comprising two said protective devices connected to opposite ends of said pilot wire means, each device comprising
    a polarised relay having an operating coil connected in parallel with at least part of the said resistor means at the associated end of the selected section whereby the two relays separately respond to current flow in different directions through said pilot wire means.

6. A protective circuit arrangement according to claim 1, comprising two said protective devices connected to opposite ends of the pilot wire means and
    two further bridge rectifiers respectively connected to the two protective devices, each device comprising
    a polarised relay having a restraining coil connected in series with the associated resistor means, and an operating coil connected in series with the restraining coil through a said further bridge rectifier whereby the current flow through said operating coil is in one and the same direction in response to current flow in either direction through said pilot wire means.

References Cited by the Examiner

UNITED STATES PATENTS

| | | | |
|---|---|---|---|
| 1,888,718 | 11/1932 | Friedlander | 317—27 |
| 1,980,395 | 11/1934 | Fitz Gerald | 317—27 |
| 2,523,148 | 9/1950 | Schaelchlin | 317—27 |
| 3,119,952 | 1/1964 | Johnson | 317—27 |
| 3,153,747 | 10/1964 | Sofianek et al. | 317—36 |

MILTON O. HIRSHFIELD, *Primary Examiner.*

SAMUEL BERNSTEIN, *Examiner.*

R. V. LUPO, *Assistant Examiner.*